United States Patent [19]

Herzl

[11] 4,019,384
[45] Apr. 26, 1977

[54] DIGITAL READ-OUT SYSTEM FOR EXTERNAL-SENSOR VORTEX FLOWMETER

[75] Inventor: Peter J. Herzl, Morrisville, Pa.

[73] Assignee: Fischer & Porter Co., Warminster, Pa.

[22] Filed: Apr. 2, 1976

[21] Appl. No.: 673,096

Related U.S. Application Data

[63] Continuation-in-part of Ser. No. 445,869, Feb. 26, 1974, Pat. No. 3,946,608.

[52] U.S. Cl. .......................................... 73/194 VS
[51] Int. Cl.² .......................................... G01F 1/32
[58] Field of Search ........ 73/194 E, 194 B, 194 VS

[56] References Cited

UNITED STATES PATENTS

| | | | |
|---|---|---|---|
| 3,116,639 | 1/1964 | Bird | 73/194 |
| 3,873,814 | 3/1975 | Mirdadion | 73/194 |
| 3,888,120 | 6/1975 | Burgess | 73/194 |

*Primary Examiner*—Herbert Goldstein

[57] ABSTRACT

A vortex flowmeter for installation in water or other lines to be tested on occasion. The flowmeter includes a flow tube forming a passage for the fluid to be metered and an obstacle assembly mounted therein and capable of generating fluidic oscillations causing a deflectable section of the assembly to vibrate at a corresponding frequency proportional to flow rate. The vibrations of the deflectable section are transmitted to a coupling point outside of the flow tube, whereby the flow rate in any installed flowmeter may be read by an external sensor engaging the coupling point to produce a signal which is fed to a digital indicator, the same system being used to read all of the flowmeters. In order to correct for disparities in the meter factors of the various flowmeters, each meter is provided with an impedance element whose value is determined by the degree of correction required. This element is connected to the indicator system when the coupling point of the flowmeter is engaged by the sensor, the element effecting a change in the time base whereby the resultant digital indication is corrected for the meter factor. Means are also provided to linearize the meter reading.

14 Claims, 8 Drawing Figures

DIGITAL READ-OUT SYSTEM FOR EXTERNAL-SENSOR VORTEX FLOWMETER

RELATED APPLICATION

This application is a continuation-in-part of the copending Herzl application Ser. No. 445,869, filed Feb. 26, 1974, now U.S. Pat. No. 3,946,608, entitled "Vortex Flowmeter with External Sensor."

BACKGROUND OF INVENTION

This invention relates generally to vortex-type flowmeters adapted to operate in conjunction with a common external sensor coupled to a digital indicator whereby the same sensor and indicator system may be used to take readings from a large number of installed flowmeters, and more particularly to an arrangement which automatically compensates for differences in individual meter factors so that accurate readings are obtainable from all of the flowmeters despite these differences.

Artificial lift expedients are often required to increase oil recovery at oil well sites. One widely used form of secondary recovery is the water-flood technique wherein pressurized water is forced through an injection well adjacent the site of the producing well, the injected water flooding the oil bearing region and providing the necessary pressure for oil extraction. In a secondary recovery system, oil intermingled with water is yielded by the producing well. The water is thereafter separated from the oil and is returned to injection pumps delivering water to several injection wells, so that the secondary recovery system involves a network of water lines leading to a group of functioning wells. Waterflood techniques are also currently in use in uranium mining.

In maintaining and servicing a waterflood system, it is necessary to periodically check the water flow rate at various points in the water line network. The present practice is to effect measurement by means of turbine meters installed in the water lines. In the conventional turbine meter, the turbine rotor is mounted within the flow conduit, a permanent magnet being incorporated in the rotor. The rotating magnet induces an alternating-current in a pick-up coil located in the external housing of the meter, the frequency of the generated signal being proportional to the volumetric flow rate. The frequency of the signal is converted into a reading of flow rate.

Since turbine meters are relatively expensive, and a waterflood system requires a large number of such meters, one recent innovation has been to omit the pick-up coil from the meter and to provide a separate pick-up coil coupled to a battery-operated test set which affords a flow rate reading. This practice is feasible since it is only occasionally necessary for an operator to check flow rate at the meter installation and then, if necessary, to make a manual valve adjustment to correct flow rate. Thus the operator who carries the pick-up coil and the test set makes a tour of the various turbine meter installations to check the flow rate.

The main drawback of turbine flowmeters in the context of a waterflood system is that because it has a rotor which is exposed to the water, there is a reliability problem in that the water being measured is often dirty and tends to foul and degrade the rotor and its bearings, particularly if the water contains abrasive particles and corrosive chemical constituents. Hence after prolonged use, the turbine meter may become inoperative or inaccurate.

In my copending application, above-identified, there is disclosed a vortex-type flowmeter adapted to operate in conjunction with an external sensor coupled to a portable digital read-out device whereby the same external system may be used to take readings from a large number of installed flowmeters. The installed flowmeters are therefore altogether devoid of electrically-powered devices so that no danger exists in environments that cannot tolerate unattended electrical circuits.

The flowmeters disclosed in the copending application includes a flow tube forming a passage for the fluid to be metered and an obstacle assembly disposed in the tube and capable of generating strong fluidic oscillations which cause a deflectable section of the assembly to vibrate at a corresponding rate. Disposed within the deflectable section is a rod which is caused to vibrate at the same rate, the rod vibration being transferred to a probe placed within a nondeflectable section of the obstacle assembly and extending to the exterior of the tube, whereby the vibrations of the deflectable section within the conduit are transmitted to the exterior thereof.

The probe extension terminates in a coupling head which is engageable by a sensor adapted to convert the probe vibrations into a corresponding electrical signal whose frequency is proportional to flow rate. The sensor is coupled to a test set serving to convert the signal into a flow rate reading. Such meters will hereinafter be referred to as external-sensor vortex-type flowmeters.

As a practical matter, it is virtually impossible to manufacture on a large scale external-sensor vortex-type flowmeters possessing identical meter factors. The meter factor represents the number of cycles generated per gallon of fluid passing through the flow tube. The calibration curve for a vortex-type flowmeter is produced by plotting the Reynolds number of the flow tube against the meter factor.

In making flowmeters on a mass-production basis, variations in the flowmeter structure invariably give rise to different meter factors. For example, manufacturing tolerances in the commercial piping or forgings used for making the meter are such that no two flow tubes have exactly the same diameter or other parameters. Hence when the same sensor and digital indicator system is used in conjunction with a group of flowmeters, the respective readings will be erroneous to an extent determined by the degree to which the actual meter factor of the meter being read deviates from the nominal meter factor for which the system is designed.

Another problem encountered in vortex-type flowmeters used in water flood applications is in regard to meter accuracy or linearity. Because the flow rates in this application are relatively low, the meters designed for measuring these rates are quite small and somewhat non-linear. Hence even if the flowmeter reading is corrected for meter factor, the reading is still lacking in accuracy.

SUMMARY OF INVENTION

In view of the foregoing, it is the main object of this invention to provide an external sensor vortex type flowmeter adapted to operate in conjunction with a digital indicator system whereby the same sensor and digital indicator system may be used to take accurate readings from a large number of installed flowmeters having disparate meter factors.

More particularly, it is an object of this invention to provide a digital indicator system which cooperates with an impedance element borne by each flowmeter and having a value determined by the degree of meter factor correction required to provide readings which are compensated for the differences in the meter factors of the various meters being read.

Also an object of the invention is to provide a system of the above-type which includes means to improve the linearity of the meter at low flow rates.

Briefly stated, these objects are attained in a vortex-type flowmeter within whose flow tube there is mounted an obstacle assembly having a deflectable section which is caused to vibrate at a rate depending on the flow of fluid through the tube, the vibrations being transmitted to a first external coupling head.

Also provided is a second external coupling head to which is connected an impedance element whose value is determined by the degree of meter factor correction required by the particular flowmeter. With a family of such flowmeters, each meter impedance element has an appropriate value.

The common system for obtaining flow rate readings from the family of flowmeters includes a pick-up device constituted by a sensor adapted to engage the first head to convert the vibrations to a corresponding electrical signal, and a tip adapted to engage the second head to provide a connection to the impedance element.

The signal from the sensor is applied to a trigger to produce pulses at a rate corresponding to the signal frequency, which pulses are applied to a pulse counter whose output is fed to a digital indicator. The tip is connected to the timing circuit of a one-shot time base which is operatively coupled to the counter to render the counter operative for an interval determined by the impedance element, whereby the number of pulses entered into said counter during this interval and displayed by the indicator represents the flow rate corrected for the meter factor.

To correct for errors in linearity, the system includes means to interrupt the flow of pulses to the counter at the outset of the time base interval to subtract pulses from the count to an extent sufficient to improve the linearity of the family of flowmeters. This correction is effected by a throw-away counter which closes a gate interposed between the trigger and the pulse counter and holds the gate closed for a predetermined number of pulses.

OUTLINE OF DRAWING

For a better understanding of this invention as well as further features thereof, reference is made to the following detailed description to be read in conjunction with the accompanying drawing wherein.

Figure 5:
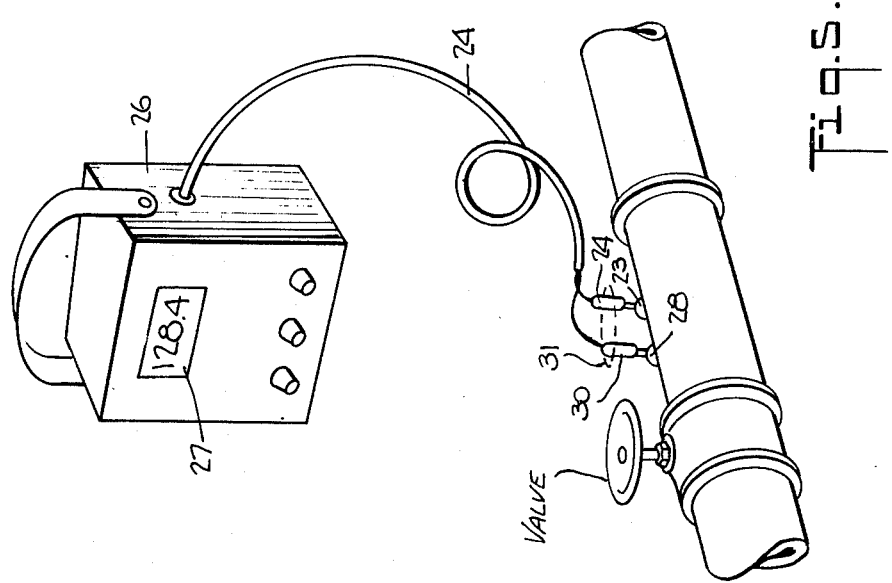
Figure 3:
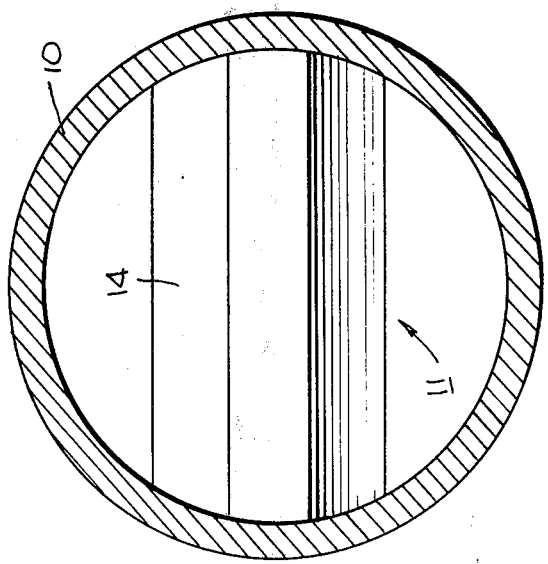
FIG. 3 is a front view of the meter.
Figure 6:
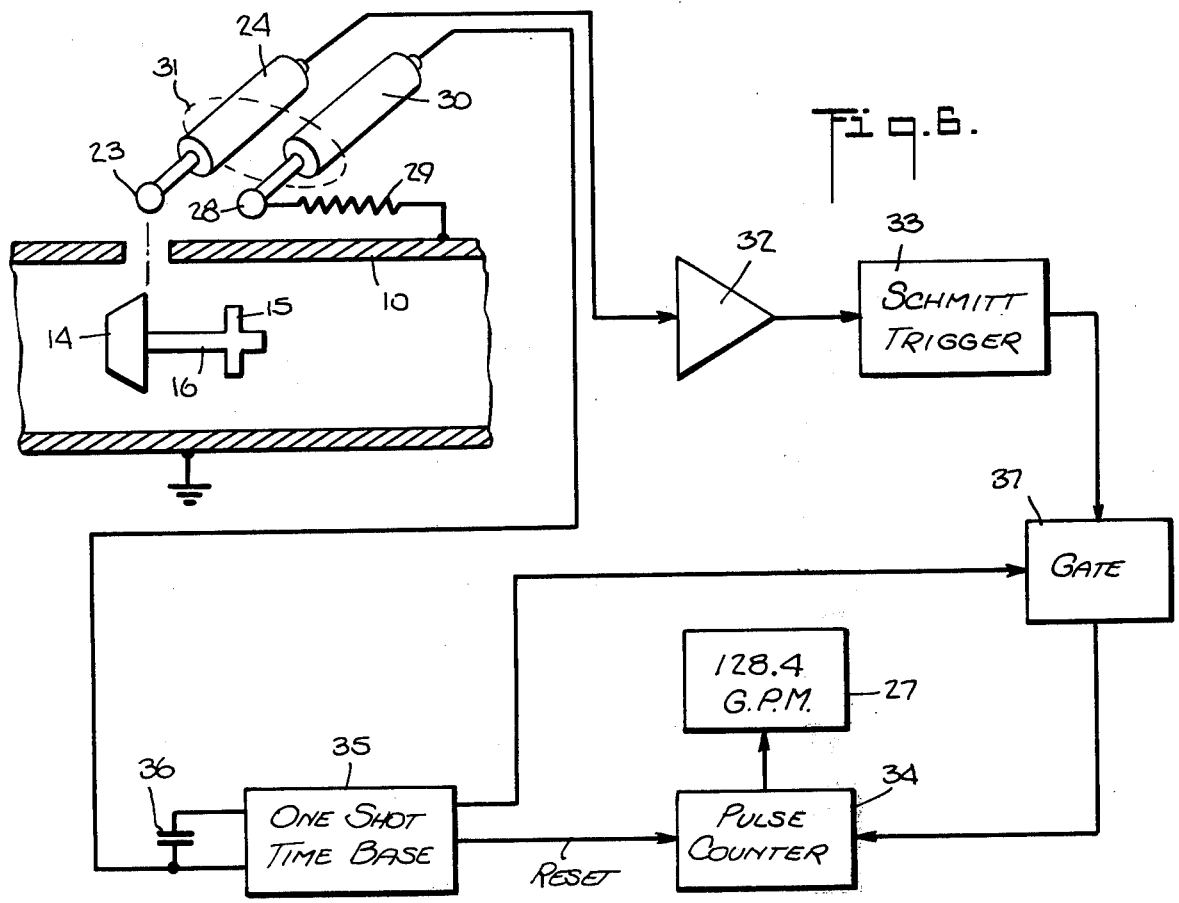

FIG. 5 schematically illustrates a flowmeter installation being tested by an indicator system having meter factor correction means in accordance with the invention;

FIG. 6 is a block diagram of the indicator system corrected for meter factor;

FIG. 7 illustrates a linearization correction curve; and

Figure 8:
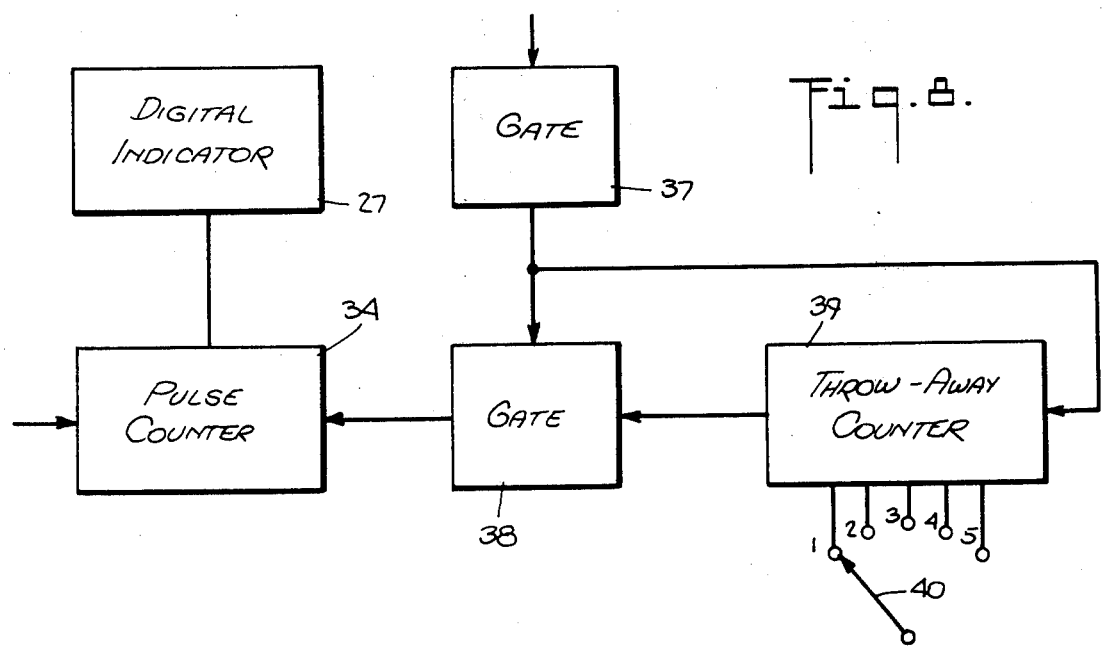
Figure 2:
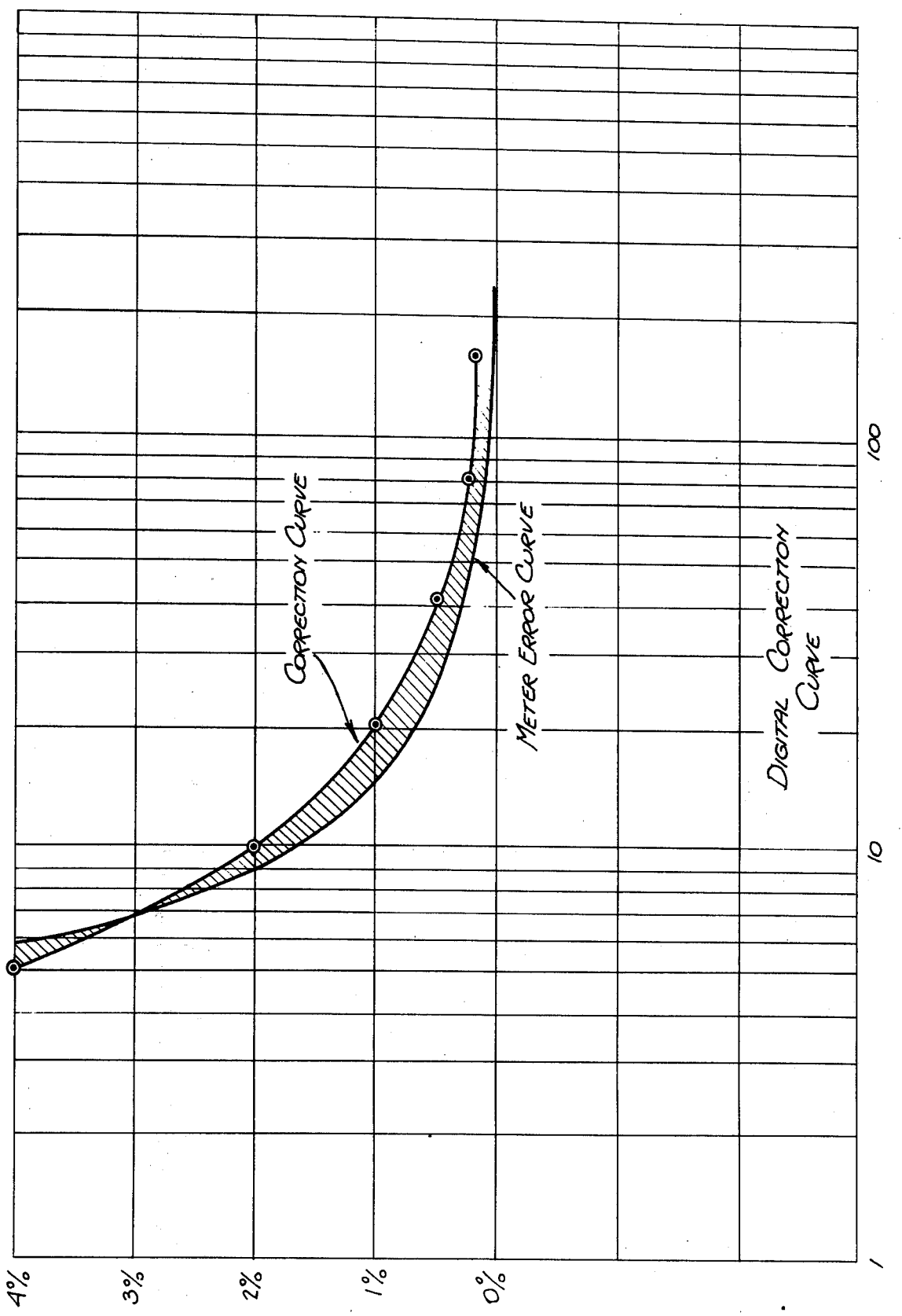

FIG. 8 illustrates the indicator system when modified to include means to improve the linearity of the meter at low flow rates.

DESCRIPTION OF INVENTION

In the vortex-type flowmeter of the type disclosed in my prior U.S. Pat. No. 3,867,839, there is provided an obstacle assembly adapted to generate strong stabilized fluidic oscillations causing a deflectable section of the assembly to vibrate at a corresponding rate. These mechanical vibrations are sensed to produce a signal whose frequency is proportional to the flow rate of the fluid. In the flowmeter disclosed in this patent, the mechanical vibrations are sensed by one or more strain gauges mounted within the deflectable section to produce periodic changes in electrical resistance, resulting in a signal whose frequency is proportional to the vibratory rate and hence to the flow rate of the fluid. In the present invention, a similar obstacle assembly is employed, but the vibrations of the deflectable sections are detected by a sensor which is external to the assembly.

This arrangement is shown in FIGS. 1 to 4 wherein a flowmeter in accordance with this invention includes a flow tube 10 interposed in the water line for a waterflood system or in any other environment in which it is necessary to conduct an occasional test of flow rate to determine whether proper flow conditions exist. For this purpose, the flow tube may be provided with end flanges to facilitate coupling to the line.

Mounted within flow tube 10 is an obstacle assembly generally designated by numeral 11, the assembly including a deflectable section which is responsive to the Karman vortex street and is caused to vibrate microscopically at a frequency which is proportional to flow rate. Incorporated in the obstacle assembly is a vibration transmitter composed of a rod 12 and a probe 13.

Flow tube 10, which is shown as having a circular cross-section but which may be in other cross-sectional forms, includes an inlet 10A into which the water to be metered is introduced. The flow impinges on obstacle assembly 11 which acts to divide the flow around the obstacle, producing fluidic perturbations in the form of a Karman vortex street. Obstacle assembly 11 is constituted by a transversely-mounted front section 14 and a rear section 15 mounted behind the front section by a cantilever support in the form of a flexible web 16. Extending downstream from rear section 15 is a tail 17.

Front section 14 is a contoured block having a triangular or delta-shaped cross-section which is uniform throughout the long axis of the block, this axis being perpendicular to the flow axis X of the flow tube. The extremities of the front section are secured to the wall of the tube whereby the front section is held fixedly within the tube. The apex of block 16 faces the incoming fluid, the inclined sides thereof forming leading edges which are swept by the fluid flow to create vortices.

Rear section 15 takes the form of a non-streamlined body having a rectangular cross-section which is maintained by web 16 in spaced relation to the front section, the plane of the rear section being parallel to the flat base of the front section. The rear section shape is such as to interfere with the vortex street, and the gap 18 established between the front section block and the rear section tends to trap the vortices and to strengthen and stabilize the vortex street produced thereby.

Because rear section 15 is cantilevered by means of flexible web 16, it is deflectable. The web, though bendable, has sufficient rigidity so as to permit only a slight deflecton of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. This vibratory motion in enhanced by tail 17. The downstream section of the assembly carries out two functions, for this section which interferes with the wake not only stabilizes it to enhance its detectability, but its vibratory motion gives rise to the output signal.

Because of the deflectable system is relatively rigid, the total excursion of the rear section is minute even at the highest amplitudes of fluidic oscillation, so that metal fatigue of the supporting web, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

The minute vibrations of the deflectable rear section of the obstacle assembly are sensed outside of flow tube 10 rather than within the tube. For this purpose, the vibrations are transmitted by rod 12 whose rear portion is socketed within a bore 19 which extends in a path coincident with flow tube axis X from a point about midway in web 16 to a point at the junction of rear section 15 and tail 17. The front portion of rod 12 lies freely within a relatively large diameter bore 20 communicating with the smaller diameter bore 19 and extending well into front section 14.

Figure 1:
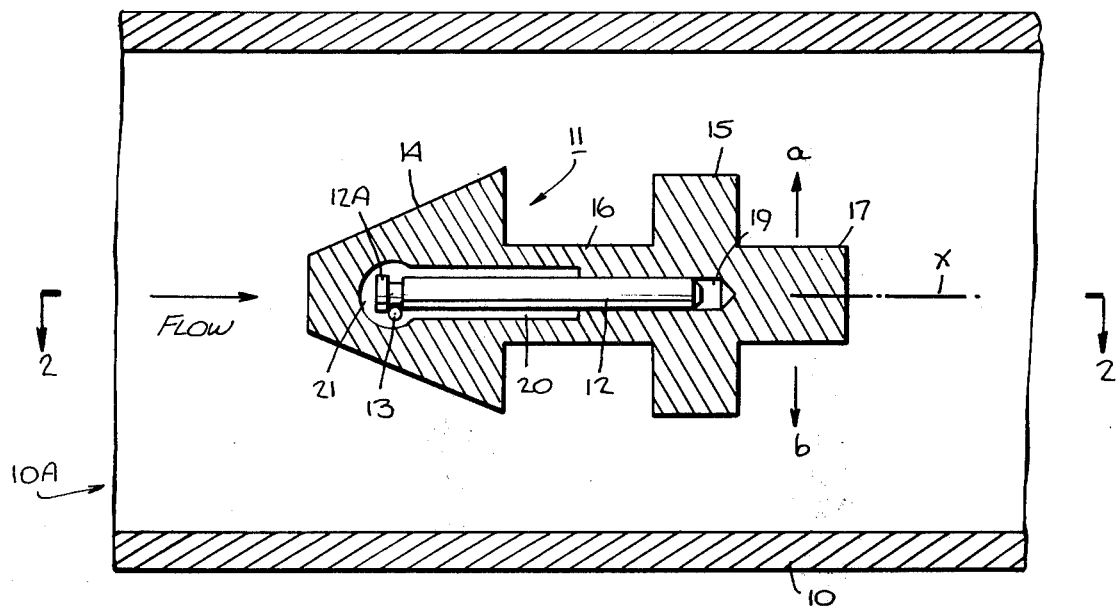
FIG. 1 is a longitudinal section taken through an external-sensor vortex flowmeter operating in conjunction with a digital indicator system provided with an automatic meter factor correction arrangement in accordance with the invention.
Figure 2:
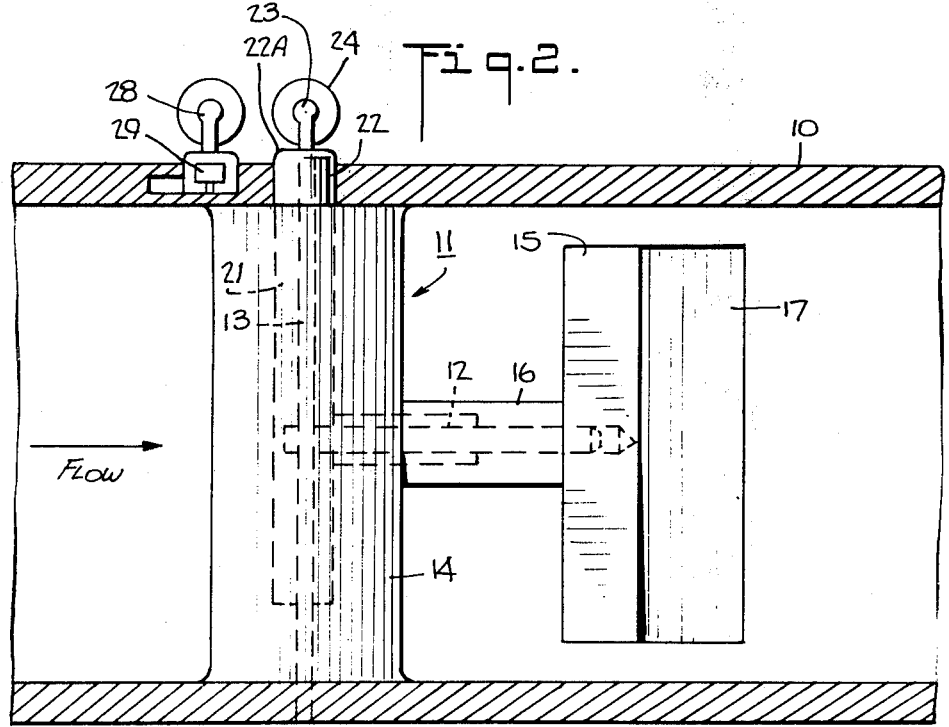
FIG. 2 is a section taken through the meter shown in FIG. 1 in the plane indicated by line 2—2 in FIG. 1.
Figure 4:
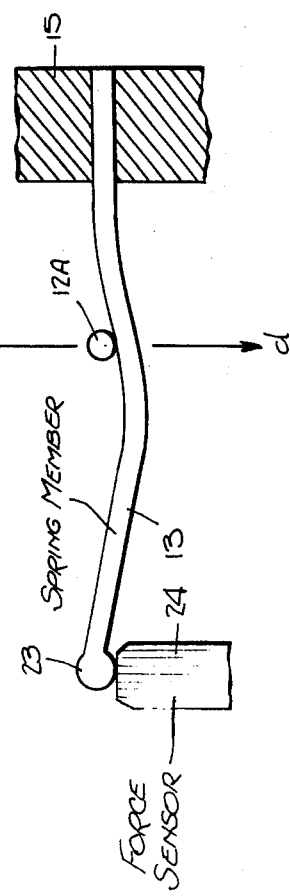
FIG. 4 shows the probe element of the meter.

The vibrating motion of rear section 15 and of tail 17 attached thereto is represented in FIG. 1 by letters $b - b$, and since the rear portion of rod 12 is socketed in this section, the front portion of the rod vibrates therewith. This vibratory action at the tip 12A of the rod is indicated in FIG. 4 by letters $c - d$. The vibrating motion of the rod is transferred to the exterior of the flow tube by probe 13 which is formed of spring material, one end of the probe being anchored in the wall of the flow tube. Probe 13 extends through an internal bore 21 formed in a non-deflectable front section 14 along an axis at right angles to tube axis X, the bore registering with a small opening 22 in the wall of the flow tube. The free end of probe 13 protrudes through opening 22 and terminates in a first coupling head 23. Opening 22 in the flow tube is sealed by a rubber diaphragm 22A.

As shown in FIG. 4, probe 13 is bent or otherwise shaped so that the probe which is of spring material is biased away from tip 12A of the vibrating rod. When, however, coupling head 23 is depressed by an external vibration sensor 24, the body of the probe is shifted so that it is received within a slot in tip 12A and is thereby brought into operative engagement with rod 12. In this way, the vibrations of rod 12 are transferred by probe 13 to the external vibration sensor 24. Thus the probe is normally quiescent and vibrates briefly only during an actual flow rate test, thereby minimizing possible wear.

Any vibration sensor capable of responding to a vibratory action to produce a corresponding electrical signal may be used in conjunction with the first coupling head 23 of the probe. A preferred sensor for this purpose is a quartz piezoelectric load cell, such as the "Piezotron" load cell (922 series) manufactured by Kistler Instrument Company of Redmond, Wash. This is a very stiff, rugged force sensor responsive to minute incremental forces and usable in environments contaminated by dust, dirt or moisture without any adverse effect on signal transmission.

The output of vibration sensor 24 is connected, as shown in FIG. 5, by a cable 25 to a portable test set 26 wherein the output is converted into a digital signal and applied to a suitable indicator 27 to provide a flow rate reading.

Thus, an operator equipped with a vibration sensor and test set can readily check flow rate simply by pressing the sensor to the exposed coupling head 23 of the vortex meter installed in the water line. And using the same equipment, the operator can take readings at all other vortex meter installations. Since the installed meter has no moving parts, it presents no reliability problem and can be depended on to provide accurate readings at all times.

Instead of a force sensor to detect the vibrations at the coupling head 23 of the meter, one may incorporate a permanent magnet in the coupling head and then make use of an inductive pick-up coil to provide the desired output. Also, the vibration transmitter, instead of being composed of two elements (rod and probe), may be formed of a single curved transmitting line attached at one end to the deflectable section and passing out of the obstacle assembly to an exterior coupling point.

METER FACTOR CORRECTION

Also provided on the exterior of flow tube 10 is a second coupling head 28 which, as shown schematically in FIG. 6, is connected to one end of an impedance element 29 (shown as a resistor). In practice, this element may take the form of adjustable iron-core inductor or a variable capacitor. The other end of element 29 is connected to metal flow tube 10 which is grounded. The value of element 29 is weighted, in a manner to be later explained, to effect a meter factor correction appropriate to the meter on which it is permanently mounted.

Second coupling head 28 is engaged by a connector tip 30. Tip 30 and sensor 24 are combined into a pick-up device 31 so that both sensor 24 and tip 30 make simultaneous contact with the respective coupling heads. The pick-up device 31 is indicated by a dotted line encircling the sensor and tip, but in practice this device may take the form of a single handle from which the sensor and tip project.

As shown in FIG. 6, sensor 24 is connected to the input of an amplifier 32 whose output is applied to a Schmitt trigger 33 which generates pulses at a rate corresponding to the frequency of the signal yielded by the sensor. Consequently, the pulse rate is proportional to fluid flow rate. The pulses from the trigger are applied to a standard pulse counter 34.

The pulses counted by pulse counter 34 provide a count which is applied to a digital indicator 27 to give gallons-per-minute flow rate reading. Counter 34 is rendered operative by means of a one-shot time base 35 for a predetermined timing period (i.e., two or three seconds), the pulse counter being reset by the time base at the beginning of each timing period.

Time base 35, which in practice may be in the form of an integrated circuit chip, such as time base Model 555 manufactured by the Signetics Corp., generates an output whose duration is determined by the time constant of its timing circuit, the output being periodically repeated.

The timing period of time base 35 is determined by the time constant of an R-C network formed by a capacitor 36 and the impedance element 29 which is connected to the time base when the pick-up device 31 is brought into engagement with the coupling heads on the flowmeter. The value of the impedance element is such as to provide a timing period which takes into account the particular meter factor and corrects therefor.

The output of time-base 35 is applied to a normally-closed gate 37 which is interposed between Schmitt trigger 33 and pulse counter 34, so that as long as the gate is closed, no pulses are counted. Gate 37 is opened by the output of time base 35 during the timing period, so that the pulses representing flow rate are counted during this period to produce a count which is displayed by digital indicator 27.

Time base 37 repeats its output; hence at the outset of each timing period, pulse counter 34 is reset to zero and then proceeds to count the incoming pulses until the period is concluded, the count then appearing on indicator 27 which gives the flow rate reading for the preceding timing period, so that the reading is always being updated. Inasmuch as this timing period depends on the meter factor of the meter being read, the reading is corrected therefor.

Linearization

Referring now to FIG. 7, curve I is a meter error curve wherein the percentage of rate error is plotted against gallons-per-minute. To linearize the error curve, an arrangement as shown in FIG. 8 is provided, which is the same as that shown in FIG. 6 except that the output of gate 37, instead of going directly to pulse counter 34, is fed to this counter through a second gate 38 which is controlled by a throw-away counter 39 responsive to the pulses yielded by gate 37.

At the beginning of the timing period and in response to the first pulse yielded by gate 37, throw-away counter 39 acts to close gate 38, thereby blocking the flow of pulses to pulse counter 34. Gate 38 will be held closed by throw-away counter 34 for a period determined by the setting of its selector switch 40. If, therefore, this switch is set to number 2, this means that gate 38 will be held closed for two pulses, and if set to 3, for three pulses, and so on.

After throw-away counter 39 has entered the number for which it is set, it then acts to open gate 38 to permit the flow of pulses to pulse counter 34. Thus throw-away counter 39 serves to substract from the total number of pulses entered into pulse counter 34 during the timing period determined by time base 35, a fixed number of pulses. Thus if throw-away counter 39 is set to four, it will subtract four pulses from the pulse counter.

Let us, by way of example, assume that the meter error at 10.0 GPM is 2% and that 10.0 GM is represented in pulse counter 34 by a 100 pulse count. That is to say, when the liquid is flowing through the flowmeter at a rate of 10 gallons per minute, the frequency of the resultant sensor signal is such as to produce one hundred pulses during the timing period which is determined by the time base. If, now, throw-away counter 39 is set to selector position 2, it will subtract two pulses from the 100-pulse count to correct the 2% error at 10.0 GPM.

But at 20.0 GPM, this 2-pulse count correction will equal 1%; at 40.0 GPM, this 2-pulse count correction will equal 0.5%; at 80.0 GPM, this 2-pulse count correction will equal 0.25%, and at 160.0 GPM, this 2-pulse count correction will equal 0.125%.

Curve II in FIG. 7 shows the correction curve. The apparent meter error will not be the difference between curves I and II, thereby effecting a major reduction in error at low flow rates.

While there has been shown and described a preferred embodiment of a corrected vortex meter in accordance with the invention, it will be appreciated that many changes and modifications may be made therein without, however, departing from the essential spirit thereof.

I claim:

1. A flow rate measuring arrangement for use in conjunction with fluid-conducting lines, said arrangement comprising:
   A. a family of vortex-type flowmeters, each flowmeter being installed in one of said lines and including a flow tube having an obstacle assembly mounted therein to produce fluidic oscillations, the assembly being provided with a deflectable section that is set into vibration by said fluidic oscillations, a first external coupling head linked to said deflectable section whereby said vibrations are transmitted thereto, and a second external coupling head connected to an impedance element whose value is determined by the extent to which the meter factor of the flowmeter deviates from a nominal meter factor, whereby the flowmeters in said family carry impedance elements appropriate to their respective meter factors; and
   B. a common read-out system for taking a reading from each flowmeter in said family, said system comprising:
      a. a sensor engageable with said first head to produce a signal whose frequency corresponds to the vibratory frequency;
      b. means coupled to the sensor to convert said signal to pulses having the same frequency;
      c. a tip engageable with said second head to effect a connection to said impedance element;
      d. means connected to said tip to generate a timing period whose duration depends on the value of said element; and
      e. a pulse counter to count said pulses during said timing period to provide a count indicative of the flow rate of the flowmeter being read, which count is corrected for the meter factor of said flowmeter.

2. An arrangement as set forth in claim 1, wherein said sensor is a piezoelectric element.

3. An arrangement as set forth in claim 1, wherein said sensor and said tip are combined in a pick-up device whereby said heads are simultaneously engaged.

4. An arrangement as set forth in claim 1, wherein said means to convert the signal to pulses is constituted by a Schmitt trigger.

5. An arrangement as set forth in claim 1, wherein said means to generate the timing period is constituted by a one-shot time base.

6. An arrangement as set forth in claim 5, wherein said time base has a timing circuit which includes said impedance element and whose time constant is determined thereby.

7. An arrangement as set forth in claim 6, wherein said element is a resistor.

8. An arrangement as set forth in claim 6, wherein said element is an inductor.

9. An arrangement as set forth in claim 5, wherein said pulse counter is reset by said time base whereby said counter proceeds to count at the beginning of the timing period.

10. An arrangement as set forth in claim 9 where the output of said counter is applied to a digital indicator.

11. An arrangement as set forth in claim 9, further including a gate in the path of the pulses applied to said pulse counter, said gate being rendered open by said time base only during said time period.

12. An arrangement as set forth in claim 1, further including means to subtract a predetermined number of pulses from said count to linearize the reading at low flow rates.

13. An arrangement as set forth in claim 12, wherein said means includes a throw-away counter which is settable to subtract a given number of pulses from said count.

14. An arrangement as set forth in claim 13, wherein said pulses are applied to said pulse counter through a gate which is closed by said throw-away counter for an interval sufficient to subtract said given number of pulses.

* * * * *

UNITED STATES PATENT OFFICE
CERTIFICATE OF CORRECTION

Patent No. 4,019,384  Dated April 26, 1977

Inventor(s) Peter J. Herzl

It is certified that error appears in the above-identified patent and that said Letters Patent are hereby corrected as shown below:

Column 5, line 22, delete "of"

Column 5, line 47 change "b" to -- a --

Signed and Sealed this second Day of August 1977

[SEAL]

Attest:

RUTH C. MASON
Attesting Officer

C. MARSHALL DANN
Commissioner of Patents and Trademarks